United States Patent
Adragna et al.

(10) Patent No.: US 7,561,450 B2
(45) Date of Patent: Jul. 14, 2009

(54) PROTECTION DEVICE FOR A CONVERTER AND RELATED METHOD

(75) Inventors: Claudio Adragna, Monza (IT); Aldo Novelli, Parabiago (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 204 days.

(21) Appl. No.: 11/459,567

(22) Filed: Jul. 24, 2006

(65) Prior Publication Data

US 2008/0019153 A1    Jan. 24, 2008

(51) Int. Cl.
*H02H 7/122* (2006.01)
(52) U.S. Cl. ............ 363/56.03; 363/17; 323/266
(58) Field of Classification Search ............ 363/15, 363/20, 25, 26, 40, 46, 21.02, 131, 56.01, 363/56.03, 17; 323/222, 266, 285
See application file for complete search history.

(56) References Cited

U.S. PATENT DOCUMENTS

| 4,253,136 A * | 2/1981 | Nanko | 363/21.02 |
| 6,480,043 B2 * | 11/2002 | Hall et al. | 327/108 |
| 6,930,893 B2 * | 8/2005 | Vinciarelli | 363/17 |

* cited by examiner

*Primary Examiner*—Rajnikant B Patel
(74) *Attorney, Agent, or Firm*—Hogan & Hartson LLP

(57) ABSTRACT

A protection device for a converter includes at least one power switch that operates for a first time period from the time the overload or short-circuit in the converter has been detected. The protection device includes circuitry to control the power switch to minimize the power deliverable by the converter for a second time period from the end of the first operating time period, as well as circuitry to shut down the converter after the second time period.

13 Claims, 5 Drawing Sheets

PROTECTION DEVICE FOR A CONVERTER AND RELATED METHOD

FIELD OF THE INVENTION

The invention relates to a protection device for a converter and a related method.

BACKGROUND OF THE INVENTION

Half bridge converters are known in the state of the art; in offline applications two topologies of half bridge converters are used: the asymmetrical half bridge converter, shown in FIG. 1, and the LLC resonant half bridge converter (so called because the tank circuit comprises the leakage inductance and the magnetization inductance of the transformer and a capacitor) shown in FIG. 2. The power switches Q1 and Q2 of the above mentioned converters are driven in push-pull with a small delay time inserted between the switching of each one. This delay time assures that the two switches of the half bridge will not be turned on simultaneously and allows soft-switching at turn-on, that is a switching modality according to which the MOS transistors of the power switches of the half bridge goes from the cut-off condition to the saturation condition without dissipating power during the transition.

In the asymmetrical half bridge converter the switches are driven with a complementary duty-cycle. The switching frequency of the half bridge is fixed and the regulation of the output voltage against variations of the input voltage and the load is achieved by modulating the duty cycle. Since the operating frequency of the half bridge is higher than the resonance frequency of the circuit comprising the capacitor C and the inductance of the primary of the transformer, the waveforms of the currents are piecewise linear.

The LLC resonant half bridge converter comprises power switches which are driven by means of a duty cycle fixed at 50% and the regulation of the output voltage against variations of the input voltage and the load is achieved by modulating the switching frequency of the half bridge. In this case the operating frequency of the half bridge moves about the resonance frequencies of the LLC tank and the current waveforms are piecewise sinusoidal.

In general, overload and the short-circuit are the heaviest operating conditions for switching converters. In the first case a current higher than the maximum specified is requested from the converter (for example for an anomaly of operation of the load) while in the second case a very low impedance path is present at the output terminals (for example because of a load failure), which forces an output current much larger than the maximum specified. In these cases it is necessary to protect the converter by limiting the output average current at lower values so as to prevent power elements from overheating and not to endanger the reliability of the power supply unit.

In all converters this is done by inserting sensing means of the currents flowing through one or more power elements and by activating the protection circuits when the read current level is higher than a preset value.

In PWM (Pulse Width Modulation) controlled converters, like the asymmetrical half bridge converter, since energy is controlled by the duty cycle of the switches, the protection circuit can act by reducing the duty cycle. In the LLC converter energy is controlled by the operating frequency and the protection circuit acts by increasing the operating frequency.

The protection circuits must allow a maximum power flow higher than the value corresponding to the maximum load, to account for converter's circuits; therefore the energy level is still large enough to damage some of the power components of the converter. Then, it is necessary to shut down the converter and let it restart after a certain time period; in this way, if the overload/short-circuit lasts long, the converter will operate intermittently, thus reducing the average value of the energy.

The temporary shutdown and the consequent onset of intermittent operation must be delayed for a certain time period. This is required because the protection circuits must assure immunity to temporary phenomena such as, for example, a temporary current absorption higher than the maximum specified.

It is therefore necessary that the converter be able to operate under overload or short-circuit conditions for a limited time period, referred to as "tolerance time". This must be short enough to prevent dangerous thermal stress but not too much, to prevent malfunctions at start-up or in presence of pulsed loads.

To solve this problem one can follow two ways. In those applications wherein the control device of the converter is supplied by an independent supply line that is not conditioned by the operation of the same converter, user-programmable timers force converter's shutdown when the converter operates under anomalous conditions for more than a preset time and allow its restart after another preset time period.

In applications wherein the supply line of the control device is derived from the same converter, delayed shutdown is often automatically obtained because the voltage produced by the self-supply system is not sufficient to keep the voltage above a certain value under which the control device (and, as a consequence, the entire converter) shuts down. In this case the control device shuts down after a certain time related to the discharge time of the reservoir capacitor of the self-supply system. Once shut down, its dissipation is very low and the current sourced by the start-up circuit of the converter charges the capacitor, increasing the supply voltage until the control device and the converter turn on.

In half bridge converters, in addition to the aforementioned issues, there is a problem due to the presence of the blocking capacitor.

In the asymmetrical half-bridge, since under overload conditions the duty cycle is 50%, the capacitor, which is quite big, will be charged at about half the input voltage. At converter's start-up after the temporary shutdown as above mentioned, the capacitor is still charged and causes considerable unbalance of the voltages at the terminals of the transformer. This determines high currents until the capacitor's voltage approaches the balance value; in this way it is possible that the transformer saturates temporarily, with current levels difficult to control.

In the case of LLC converter the typical values of the capacitor are smaller; however the voltage values which can be observed under short-circuit condition are higher; the situation is not much different from the case of the asymmetrical half-bridge, although the presence of the leakage inductance reduces the saturation problems of the transformer.

Two ways are followed to solve the above mentioned problems. One way is that of placing discharge means of the capacitor, such as a resistance in parallel to the capacitor; this has the disadvantage of being dissipative, thus hurting converter's efficiency. Another way is that of adding a current sensing circuit and further protection circuits to limit the current peaks which occur at restart. This solution is very expensive.

SUMMARY OF THE INVENTION

In view of the state of the art described, it is an objective of the present invention to provide a protection device for a converter which overcomes the aforementioned disadvantages.

According to the present invention, this objective is obtained by means of a protection device for a converter, said converter comprising at least one power switch and being adapted to operate for a first time period from the time wherein the overload or short-circuit in the converter has been detected, said protection device comprising means adapted to control said at least one power switch to minimize the power deliverable by the converter for a second time period from the end of the first operating time period, said protection device comprising turning off means adapted to shut down the converter after said second time period.

BRIEF DESCRIPTION OF THE DRAWINGS

The features and the advantages of the present invention will be made evident by the following detailed description of embodiments thereof, shown as a not limiting examples in the annexed drawings, wherein.

DETAILED DESCRIPTION

Figure 1:
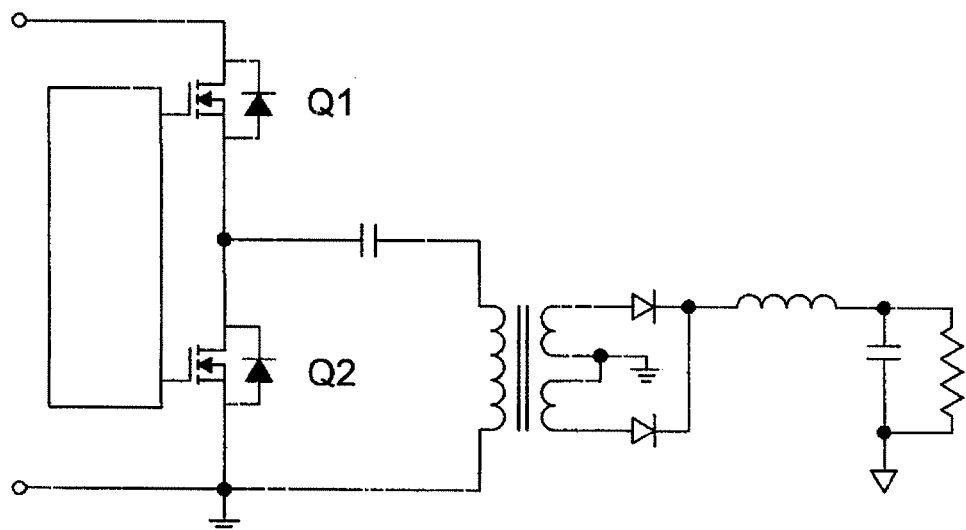
FIG. 1 is a schematic view of an asymmetric half bridge converter according to prior art.
Figure 2:
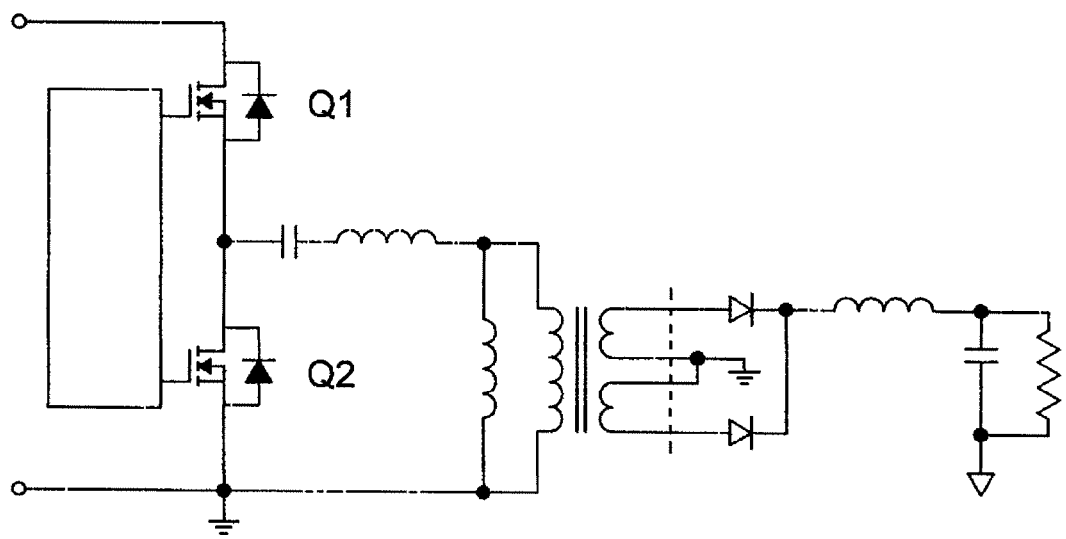
FIG. 2 is a schematic view of a LLC half bridge converter according to prior art.
Figure 3:
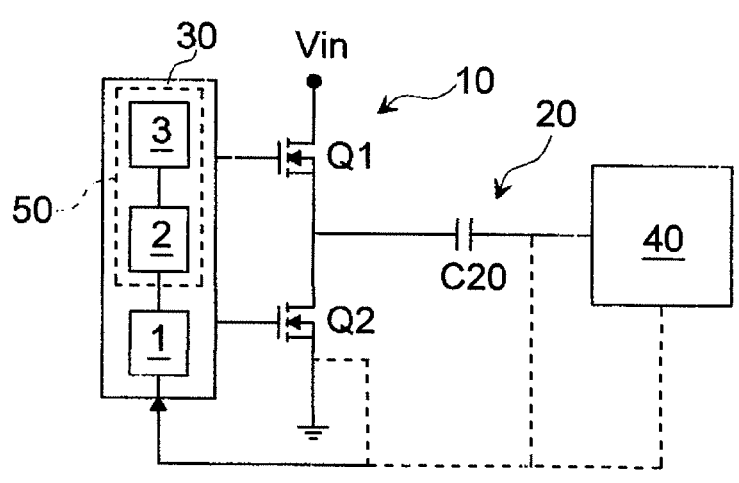
FIG. 3 is a schematic view of a protection device for a half bridge converter according to the invention.

Referring to FIG. 3 a protection device for a converter, particularly for a half bridge converter, according to the invention is shown. The half bridge 10 of the converter 20 is driven by a control device 30 and comprises the high side and low side power switches Q1 and Q2; the half bridge 10 is placed between an input voltage Vin and ground GND and controls the current flow into the capacitor C20 and into a part 40 of the converter 20. The control device 30 comprises means 1 adapted to sense the current flowing through the half bridge 10 or through the capacitor C20 or through the circuit 40 and to indicate the presence of a overload or a short-circuit to a protection device 50. The last one comprises means 2 adapted to set a first predetermined operating time period of the converter from the time of the overload or short-circuit indication and means 3 adapted to control the half bridge to minimize the power of the converter after said first time period and for a second time period. The protection device is adapted to shut down the converter after said second time period.

Figure 4:
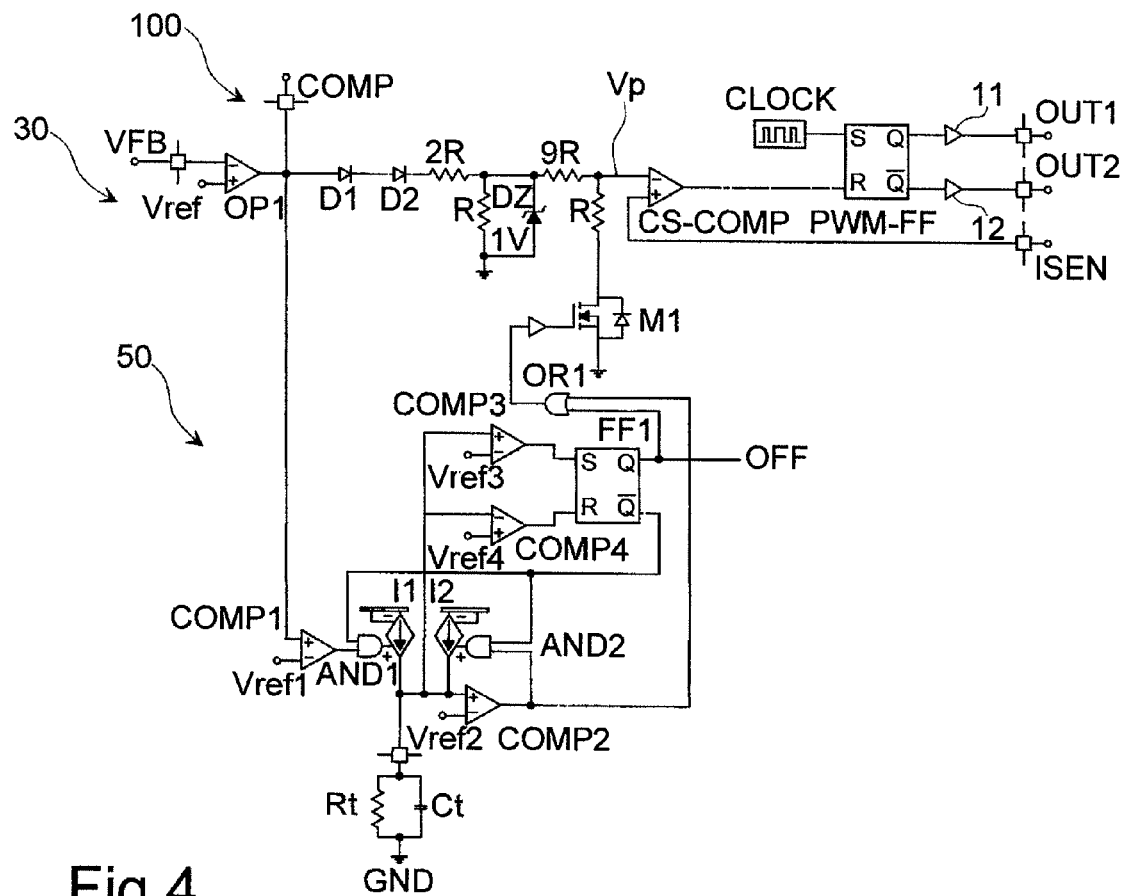
FIG. 4 is a schematic view of a protection device for an asymmetric half bridge converter according to a first embodiment of the invention.

In FIG. 4 a protection device according to a first embodiment of the invention for an asymmetric half bridge converter is shown. This protection device 50 is coupled with a PWM modulation and control circuit 100 of the current-mode type. Particularly the circuit 100 is a circuit of the device family UC384x. [33] According to the configuration type of the feedback control loop regulating the output voltage of the asymmetric half bridge converter, the information on the output voltage Vout arrives at the pin VFB or the pin COMP. In the first case a part of the output voltage Vout is compared with a reference voltage Vref at the input terminals of an error amplifier OP1 by generating the error signal at pin COMP. Preferably, but not shown in Figure, an electric network of the R-C type is present between the pins VFB and COMP so as to assure appropriate stability and dynamic performance to the regulating loop of the output voltage Vout. In the second case the voltage reference and the error amplifier are external to the control integrated device and the error signal is transferred to the pin COMP. In this case the pin VFB is connected to ground and the pin COMP is driven in current.

Whichever the configuration, the error signal at the pin COMP is offset by a voltage 2*Vf (wherein Vf is the forward voltage across either diode D1 or D2) and is divided by three by a resistive divider. The obtained signal VP is provided to a PWM comparator CS-COMP which compares it with a voltage at the pin ISEN; said voltage ISEN is obtained by means of a current-to-voltage conversion circuit which reads the instantaneous current flowing, for example, through the switch Q1 of the half bridge 10. The output signal of said comparator is present at the reset input R of a set-reset flip-flop PWM-FF, whose output Q controls the gate driver 11 which drives the switch Q1 by means of the output Out1 and the output Qbar controls the gate driver 12 which in turn drives the switch Q2 by means of the output Out2; a clock signal Clock is present at the set input S of the flip-flop PWM-FF.

The protection device 50 manages overload and short-circuit conditions by limiting the dynamics of the signal Vp. In fact the state change of the output signal of the comparator CS-COMP determines the turn-off of the switch Q1 and therefore the voltage at the pin ISEN cannot exceed the maximum signal present at the inverting input of the same comparator which is limited by means of the Zener diode DZ1 at 1V.

When an overload or a short-circuit condition occurs, the output voltage of OP1 is at least 4.4V, therefore the output voltage of OP1 is compared with a reference voltage having a value higher than 4.4V by means of a comparator COMP1. When an overload or short-circuit condition occurs the output of COMP1 is high and this activates a current generator I1 that charges a capacitor Ct connected to the generator I1 and ground GND. The resistance Rt in parallel to the capacitor Ct must be quite great so that the current flowing through it is negligible with respect to the current I1. Since the output of the comparator COMP1 remains high the charge of the capacitor Ct continues for all the time while the overload or short-circuit condition lasts. If this condition persists until the voltage at the terminals of the capacitor Ct reaches a value Vref2 (with Vref2=2V), the output of another comparator COMP2, which has at the input terminals the voltage across the capacitor Ct and the voltage Vref2, goes high by turning on a switch M1 coupled with the inverting terminal of the comparator CS-COMP and with ground. The turn-on of the switch MI activates a divider R-9R having the resistance 9R connected between the anode of the Zener diode DZ1 and the inverting terminal of CS-COMP and the resistance R connected between the inverting terminal of CS-COMP and the drain terminal of M1. The divider R-9R, once activated, reduces the dynamics of the input signal at the inverting terminals of CS-COMP an in turn reduces the dynamics of the signal controlling the switch Q1 and the peak current which flows through Q1. This marks the end of the first time period Tt (tolerance period), which is given by Tt=Ct*Vref2/I1 and the starting of the second time period. The high output of the comparator COMP2 activates also another current generator I2 adapted to supply the capacitor Ct; the capacitor Ct is now charged by the currents I1 and I2. This condition holds until the voltage at the terminals of the capacitor Ct reaches a value Vref3 (for example Vref3=3.5V); in fact a comparator COMP3 has the non inverting terminal connected with the voltage at the terminals of the capacitor Ct and the inverting terminal connected with Vref3. The output of the comparator COMP2 is the set input S of a flip flop set reset FF1; the output Q of the flip flop FF1, which coincides with an output signal OFF of the protection device 50, becomes high by turning off the converter (for example by deactivating the gate drivers 11 and 12). The second time period Td is given by:

$$Td = Ct \frac{Vref3 - Vref2}{I1 + I2}.$$

The output Q bar of the flip-flop FF1 deactivates the generators I1 and I2 by means of two AND gates AND1 and AND2; this allows the capacitor Ct to be slowly discharged through the resistance Rt. During the discharge at first the voltage across Ct becomes lower than the voltage Vref2, so that the output of the comparator COMP2 is low, and then goes below the voltage Vref4 (for example, Vref4=0.3V). This makes the output of the comparator COMP4, which is the reset input R of the flip-flop FF1, become high; in this way the signal OFF is deactivated and the transistor M1 is turned off. The duration Tdis of the discharge is $$Tdis = RtCt\ln\frac{Vref3}{Vref4}.$$

At this point the converter restarts and, if during the time period Tdis the overload or short-circuit condition has been removed, the converter will operate normally. If, instead, the anomaly is still present the above mentioned phases will be repeated and this will bring the converter to operate in intermittent mode, cycling the time periods Tdis, Td and Tt. With the above mentioned circuit the time period Tdis and the time period Tt can be selected in an independent manner. The reference voltage Vref1-Vref4 must be selected appropriately.

Figure 5:
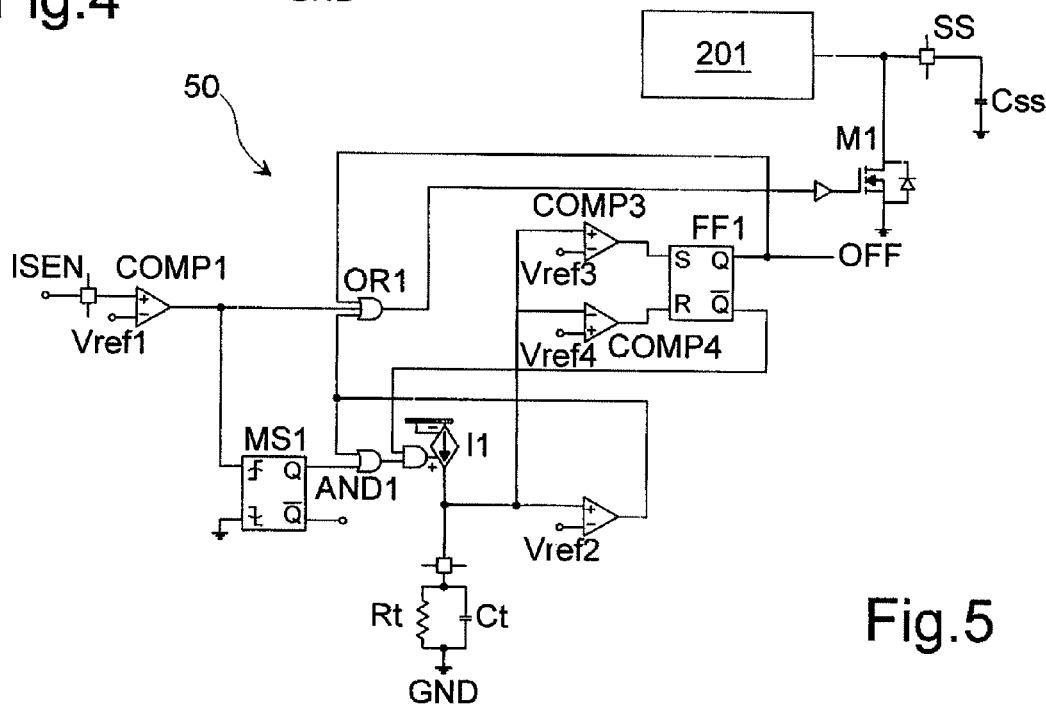
FIG. 5 is a schematic view of a protection device for a LLC half bridge converter according to a second embodiment of the invention.

In FIG. 5 a protection device for LLC half bridge converter according to a second embodiment of the invention is shown. In FIG. 5 a control circuit 200 comprising an oscillator 201 which is controllable in voltage (VCO) or in current (CCO) mode and which determines the operating frequency of the half bridge 10. The control circuit 200 has a pin SS adapted to connect a timing network, for example the capacitor Css connected to ground GND; the voltage at the pin SS controls the oscillator 201 so that the frequency of the oscillator increases to a maximum value when the voltage at the pin SS decreases. Said control circuit 200 comprises a pin ISEN at which is present a voltage proportional to the current flowing through the resonance circuit or through one between the switches Q1 and Q2. In the case of resonant half bridge, since current waveforms are piecewise sinusoidal, the current peak value in a switching cycle does not occur at the end of the conduction of the switches; therefore, a control of the maximum current cycle by cycle is not possible. It is preferably to provide to the control circuit current information averaged on some switching cycles. The voltage information on the current flowing through the resonance circuit or through one between the switches Q1 and Q2, said current being representative of the power transferred by the converter, is present at the pin ISEN. The overload or short-circuit condition for the converter is revealed when a voltage at the pin ISEN is higher than a reference voltage Vref1; a comparator COMP1 has at the inverting terminal the voltage Vref1 and at the non inverting terminal the voltage ISEN. Assuming that the capacitor Ct is discharged in case of overload or short-circuit condition, the output of COMP1 will be high for a certain time period depending on the time integration of the information at the pin ISEN and on the features of the resonant circuit. The high output of the comparator COMP1 activates a monostable device MS1 adapted to turn on a current generator I1 for a preset time period, so as to charge the capacitor Ct with a preset electrical charge. The resistance Rt in parallel to the capacitor Ct must be quite great so that the current flowing through it is negligible with respect to the current I1. The output of the comparator COMP1 asserted high turns on also a switch M1 placed between the pin SS and ground GND; this reduces the voltage on the pin SS at a rate depending on the capacitor Css and the resistance of the switch M1, and determines a corresponding increase of the frequency of the oscillator 201 for the driving the half bridge 10.

This, in turn, reduces the current flowing through the resonant circuit by limiting in this way the transferred power. The signal at the pin ISEN will be reduced and when it becomes lower than the voltage Vref1, the output of the comparator COMP1 will go low turning off the switch M1. This determines a progressive increase of the voltage at the pin SS and a correspondent decrease of the driving frequency of the half bridge; the current will go up so that the output of the comparator COMP1 will become high again.

During such an operating mode the provision of charge packets to the capacitor Ct continues for all the time while the overload or short-circuit condition holds; the entity of each packet is regulated by the device MS1 and the current I1 and the starting time depends on the response of the converter to the variations of the oscillator 201 and on the features of the current sensing circuit. If the overload or short-circuit condition lasts until the voltage across the capacitor Ct reaches the value Vref2 (for example Vref2=2V), the output of the comparator COMP2, which has the voltage across Ct at the non inverting input terminal and the reference voltage Vref2 at inverting input terminal, becomes high by forcing high the outputs of the OR gates OR1 and OR2 wherein the inputs of the gate OR1 are the output of COMP1, the signal OFF and the output of COMP2, and the inputs of the gate OR2 are the output of COMP2 and that of MS1; the output of OR1 controls the switch M1 and the output of OR2 controls the generator I1. This indicates the end of the tolerance time period.

With the output of OR1 high the switch M1 stays on, thus bringing the voltage on the pin SS to the minimum level, so that the oscillator 201 and the half bridge operate at the maximum frequency. Consequently, the current which flows through the resonant circuit, as well as the power transferred to the output of the converter will be minimized. This generates the second time period.

With the output of the gate OR2 high the generator I1 stays on, so that the charge of the capacitor Ct is continuous and therefore quicker. This situation goes on until the voltage across the capacitor Ct reaches the value Vref3 (for example Vref3=3.5V). The voltage Vref3 is at the input inverting terminal of a comparator COMP3 which has the voltage across the capacitor Ct at the non inverting terminal; the output of COMP3 is the input set S of a flip-flop FF1. When the voltage across the capacitor Ct reaches the value Vref3 the output of the comparator COMP3 becomes high by setting the flip-flop FF1. The output Q of FF1, that is the signal OFF, becomes high by turning off the converter, for example by deactivating the drivers 11 ad 12. The second time period Td will last $$Td = Ct \frac{Vref3 - Vref2}{I1 + I2}.$$

The output Q bar of the flip-flop FF1 deactivates the generator I1 by means of the AND gate AND 1; this allows the capacitor Ct to be slowly discharged through the resistor Rt. During the discharge, at first the voltage across Ct becomes lower than the voltage Vref2, so that the output of the comparator COMP2 is low, and then goes below the voltage Vref4 (for example Vref4=0.3V). This asserts high the output of the comparator COMP4, which is the reset input R of the flip-flop FF1; in this way the signal OFF is deactivated and the transistor M1 is turned off. The duration Tdis of the discharge is:

$$Tdis = RtCt\ln\frac{Vref3}{Vref4}.$$

At this point the converter restarts; if during the time period Tdis the overload or short-circuit condition has been removed the converter will operate normally. If, instead, the anomaly is still present the above mentioned phases will be repeated and this will bring the converter to operate in intermittent mode, cycling the time periods Tdis, Td and Tt. With the above mentioned circuit the time period Tdis and the time period Tt can be selected in an independent manner.

Figure 6:
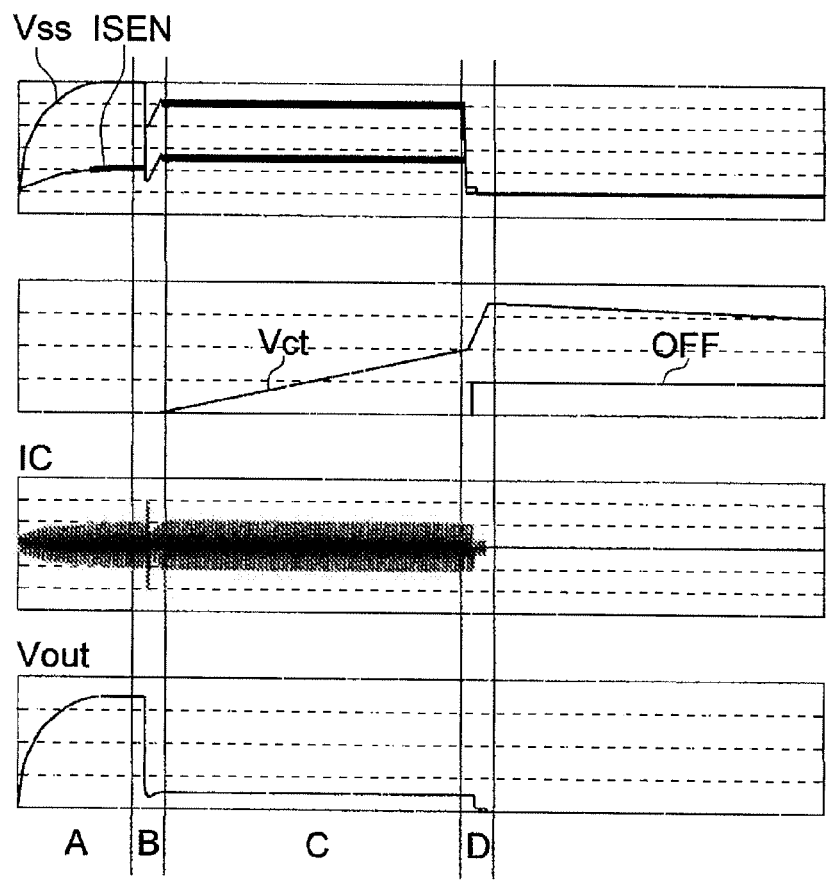
FIG. 6 shows time diagrams of signals used in the circuit of FIG. 5.

FIG. 6 shows the time diagrams of the signal of the circuit in FIG. 5. FIG. 6 shows the time diagrams of the voltage ISEN at the pin ISEN and the voltage Vss at the pin SS, the voltage Vct across the capacitor Ct, the signal OFF, the current Ic flowing through the resonant circuit and the output voltage Vout of the converter. The phase A corresponds to the start-up of the converter: the voltage at the pin SS goes up in exponential manner to the stead-state value, the current Ic of the resonant circuit and the signal ISEN increase progressively. The voltage Vout reaches the regulation value in a monotone way by means of the progressive introduction of power regulated by the voltage at the pin SS. In the phase B, with the converter already regulated, there is a short-circuit condition; initially the current Ic increases quickly and even the signal ISEN increases quickly. When this signal exceeds the voltage reference Vref1 the switch M1 is turned on and the voltage at the pin SS initially decreases quickly and, consequently, the operating frequency of the half bridge increases, which generates an initial quick diminution of the current and then a progressive increase of the same to arrive an equilibrium value corresponding to the continuous activation or deactivation of M1 (phase C). During this time the capacitor Ct is charged until the voltage across the capacitor reaches the reference voltage Vref2. The voltage Vss at the pin SS tends towards zero and the current Ic of the resonant circuit is minimized with a reduction of the power components stress. The capacitor Ct in the phase D is charged quickly by means of the current I1 so that the voltage at terminals thereof reaches the reference voltage Vref; in this way the second time period finishes and the signal OFF is high. The converter at this point is shut down ant the output current goes to zero; the generator I1 is turned off and the voltage across the capacitor Ct goes exponentially to zero with the time constant RtCt, which is so long as to allow the power components to be cooled after the stress undergone during phase C (phase E). The converter will restart when the voltage across the capacitor Ct goes below Vref4.

Figure 7A:
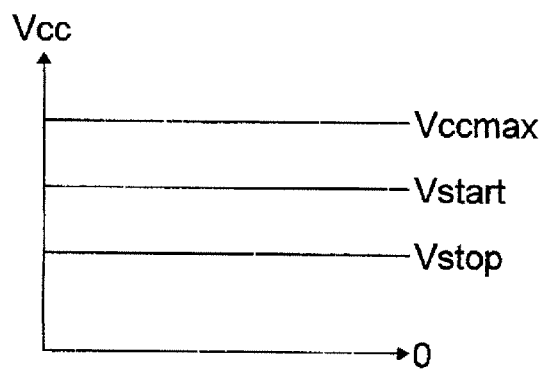
FIGS. 7a-7b show the difference between the operating interval of the supply voltage of prior art and that according to the invention.
Figure 7B:
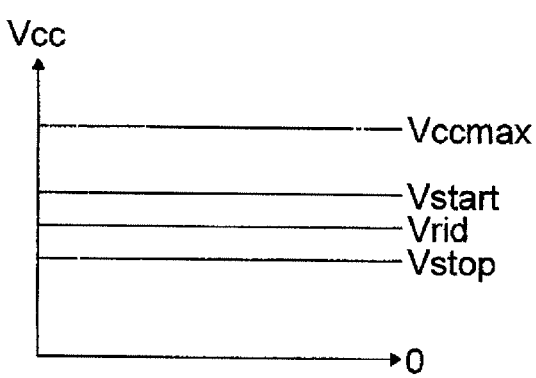

In the case of self-supplied control device, the above mentioned methodology can be actuated by providing a voltage region Vrid-Vstop next to the turn-off voltage Vstop of the control device, wherein the converter, which still is operating, is not able to transfer the maximum power. This is shown in FIG. 7b, with respect to the standard operation shown in FIG. 7a. In those figures Vccmax is the maximum allowed value of the voltage Vcc.

In fact, in applications wherein the supply of the control device is derived from the same converter, the delayed shutdown is often automatically obtained because the voltage produced by the self-supply system is not sufficient to keep the voltage above a certain value Vstop under which the control device (and, as a consequence, the entire converter) shuts down. This occurs because the voltage Vcc generated by the self-supply system is coupled with the output voltage Vout of the converter and therefore when the voltage Vout drops as a result of an overload or short-circuit condition the supply voltage Vcc goes down as well.

Figure 8:
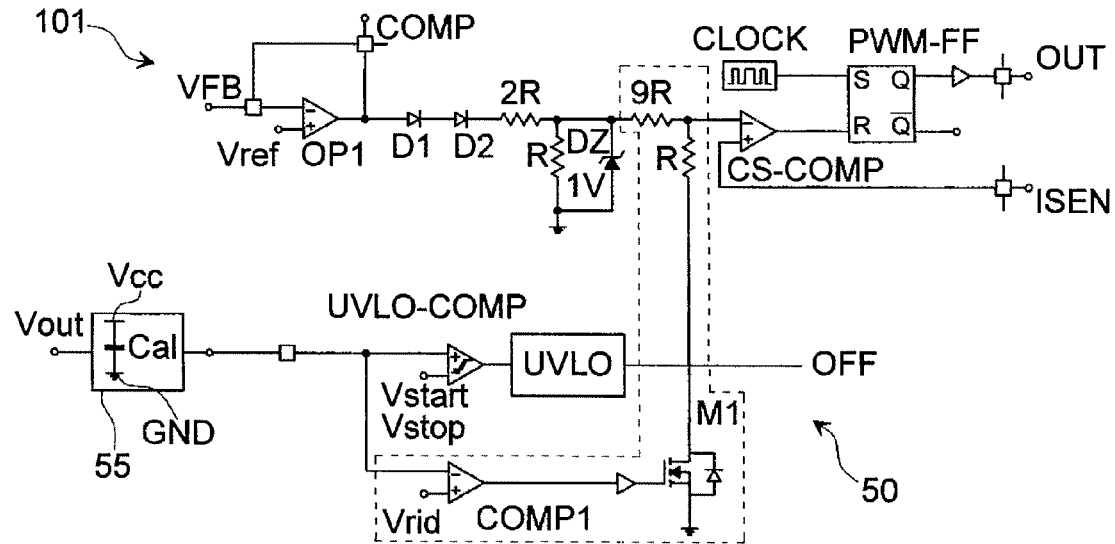
FIG. 8 is a schematic view of a protection device according to a third embodiment of the present invention.

The methodology described in FIG. 7b is performed by means of a protection device according to a third embodiment of the present invention as shown in FIG. 8. This protection device 50 is coupled with a PWM modulation and control circuit 101 of the current-mode type which is similar to the circuit 100 in FIG. 4 but, for simplicity, has only one output OUT, being obvious the extension to two complementary outputs like in FIG. 4. Particularly, the circuit 101 is a circuit of the device family UC384x.

More precisely, the methodology described in FIG. 7b is performed by means of a comparator COMP1 having the supply voltage Vcc at the inverting input and the voltage Vrid at the non inverting input, It is Vstop<Vrid<Vstart, where Vstop and Vstart are the turn-off and turn-on voltage of the control circuit respectively. The supply voltage Vcc is provided by a block 55 having a voltage proportional to the output voltage Vout of the converter as the input. The reservoir capacitor Cal is connected between the Vcc pin and ground. The tolerance time will be given by: Tt=Cal*(Vccn-Vrid)/Iq, where Vccn is the value of Vcc under normal operating conditions for the converter and Iq is the current absorbed by the control circuit. When the supply voltage Vcc of the control circuit is such that Vstop<Vcc<Vrid, the output of COMP1 is high and the transistor M1, which is controlled by the output of COMP1, is turned on and the divider R-9R reduces the maximum voltage at the inverting terminal of the comparator CS-COMP. Therefore, while operating with values of Vcc in the range between Vstop and Vrid, the allowed maximum peak current of the power switch will be 1/10 of the maximum value allowed at full load. Substantially, the maximum current that can flow through the power switch will be reduced by the same factor as well. When Vcc>Vrid the output of COMP1 goes down by turning off of M1; when Vcc<Vstop the comparator UVLO-COMP sends a signal to the block UVLO which outputs a signal OFF to turn off the converter, while when Vcc>Vstart the signal OFF is deactivated.

Figure 9:
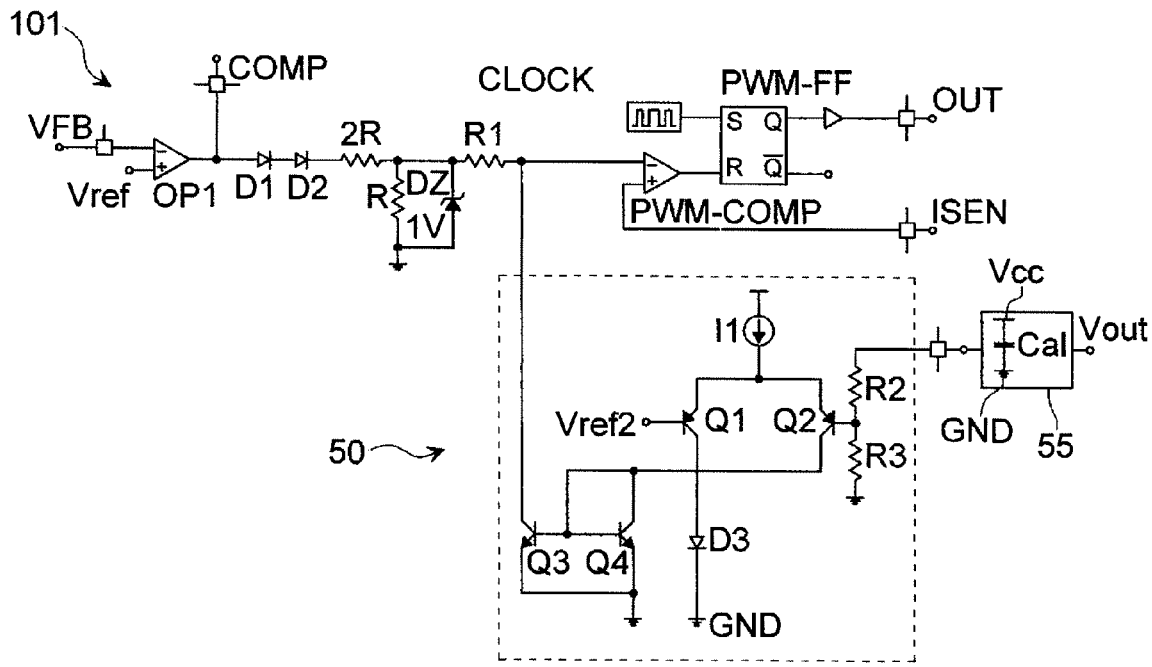
FIG. 9 is a schematic view of a protection device according to a fourth embodiment of the present invention.

In FIG. 9 a protection device according to a fourth embodiment of the present invention is shown. This protection device 50 is coupled with a PWM modulation and control circuit 101 of the current-mode type which is similar to the circuit 100 in FIG. 4 but, for simplicity, has only an output OUT, being obvious the extension to two complementary outputs like in FIG. 4. Particularly the circuit 101 is a circuit of the device family UC384x.

The voltage Vcc is always derived from the block 55 as shown in FIG. 8. In this case, when Vcc>Vrid the voltage set by the divider R2, R3 is higher than the reference voltage Vref2. In the differential pair Q1-Q2, the transistor Q2 is in cut-off state and the transistor Q1 is turned on and the current I1 flows through the diode D3 to ground GND. Q3 and Q4 will be cut off as well. By reducing the voltage Vcc until the voltage on the base terminal of Q2 is next Vref2, Q2 starts conducting and a part of the current I1 flows through the transistor Q2, is mirrored through the mirror Q3 and Q4 and flows through the resistance R1 by reducing the signal at the inverting terminal of the comparator CS-COMP. At a certain point the maximum voltage at the inverting input of CS-COMP will be equal to the saturation voltage Vcesat of the transistor Q3. In this case, differently from the case of the circuit in FIG. 8, the allowed maximum peak current at the power switch will be reduced proportionally to the reduction of Vcc.

Figure 10:
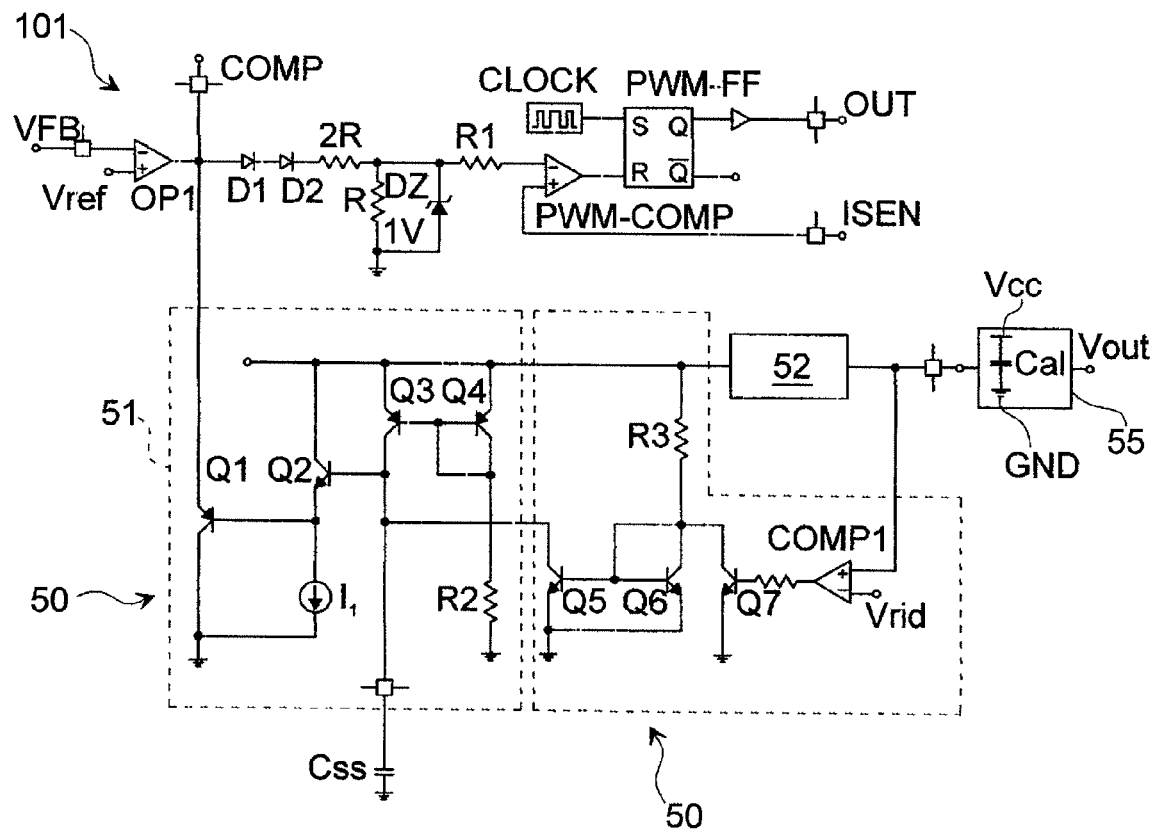
FIG. 10 is a schematic view of a protection device according to a fifth embodiment of the present invention.

In FIG. 10 a protection device according to a fifth embodiment of the present invention is shown. This protection device 50 is coupled with a PWM modulation and control circuit 101 of the current-mode type which is similar to the circuit 100 in FIG. 4 but, for simplicity, has only an output OUT, being obvious the extension to two complementary outputs like in FIG. 4. Particularly the circuit 101 is a circuit of the device family UC384x.

The control circuit in FIG. 10 comprises a circuit 51 which implements the "soft-start" function, that is, the function that, during the start-up phase of the converter, makes the power transmitted by the same converter increase progressively starting from zero. Said circuit comprises for example a capacitor Css, initially discharged, which is charged by a controlled current generator formed by the transistor Q3 and Q4 and by the resistance R2. The supplied current is equal to Vbus/R2 where Vbus is a output supply voltage of a regulator 52 which receives an input supply voltage Vcc; the voltage Vcc is always derived from the block 55 as shown in FIG. 8. The voltage across Css increases linearly until the transistor Q3 goes in cut-off state and the generator is turned off. The voltage across Css is provided to the circuit formed by the transistors Q1 and Q2. At start-up the output voltage of the comparator OP1 is high because the output voltage is lower than the regulation value; the transistors Q1 and Q2 operate in active region and the voltage on the emitter of the transistor Q1 will be equal to the voltage across the capacitor Css. Therefore, being the maximum source output current of the comparator OP1 limited, the output voltage of OP1 will follow a ramp equal to that across the capacitor Css and the reference value for the current at the inverting input of CS-COMP will go up linearly starting from zero. If the voltage Vcc is higher than the voltage Vrid, the output of the comparator COMP1 is high, the transistor Q7 is in conduction state and the current generator formed by the transistors Q5, Q6 and R3 is turned off. With Vcc<Vrid the output of COMP1 goes down, the transistor Q7 is turned off and the generator Q5, Q6 and R3 sinks a current substantially equal to Vbus/R3. If, for example, R3=R2/2, the capacitor Css is discharged with a current equal to that of the charge. The output voltage of OP1 goes down with a ramp and the reference value for the current present at the inverting input of CS-COMP goes down linearly to zero.

Figure 11:
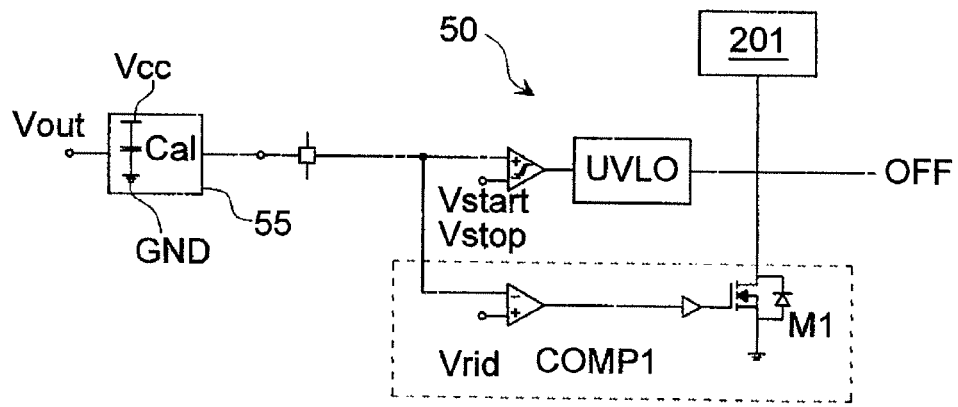
FIG. 11 is a schematic view of a protection device according to a variant of the third embodiment of the present invention.

FIG. 11 is a schematic view of a protection device according to a variant of the protection device in FIG. 8 in the case of a LLC converter. Differently from the circuit in FIG. 8 when the supply voltage Vcc of the control circuit is such that Vstop<Vcc<Vrid, the output of COMP1 is high and the transistor M1, which is controlled by the output of COMP1, is turned on and it force to ground an internal node of the oscillator 201; the voltage Vcc is always derived from the block 55 as shown in FIG. 8. In this way the oscillation frequency of the oscillator 201 is set at the maximum and the power of the circuit is minimized.

While there have been described above the principles of the present invention in conjunction with specific implementations and device processing technology, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

We claim:

1. A protection device for a converter, said converter comprising at least one power switch and operating for a first time period from the time wherein the overload or short-circuit in the converter has been detected, said protection device comprising means to control said at least one power switch to minimize the power deliverable by the converter for a second time period from the end of the first operating time period, said protection device comprising turning off means to shut down the converter after said second time period, wherein the first time period comprises a predetermined time period set by a capacitor charged at a first rate, and wherein the second time period comprises a predetermined time period set by the capacitor charged at a second rate.

2. The protection device according to claim 1, said protection device comprising other means coupled with the converter to detect the presence of an overload or short-circuit in the converter and further means to set said first operating time period of the converter from the detection time of the overload or short-circuit.

3. The protection device according to claim 2, wherein said converter comprises a half bridge including a high side transistor and a low side transistor and the converter is an asymmetrical converter, said means for reducing the duty-cycle of the high side transistor for reducing the peak current flowing through the half bridge.

4. The protection device according to claim 3, wherein said other means comprise a comparator to compare an error signal between the output voltage of the converter with a reference voltage with a first reference voltage, said comparator activating a current generator when a overload or short-circuit condition has been detected, said further means comprising said current generator charging the capacitor until the voltage across the capacitor is equal to a second reference voltage, said means comprising another comparator comparing said voltage across the capacitor and said second reference voltage and turning on a transistor when the voltage across the capacitor is equal to a second reference voltage and said transistor acting on a driving signal of the high side switch to reduce the duty-cycle of the high side transistor so as to reduce the peak current flowing through the half bridge, said turning off means comprising another comparator comparing said voltage across the capacitor and a third reference voltage and turning off the converter when said voltage across the capacitor reaches said third reference voltage.

5. The protection device according to claim 2, wherein said converter comprises a half bridge including a high side transistor and a low side transistor and the converter is a LLC resonant converter, said means forcing the half bridge to operate at the maximum operating frequency.

6. The protection device according to claim 5, wherein said other means comprise a comparator comparing an signal representative of the current flowing in the converter a first reference voltage, said further means comprises a monostable device which is activated by the comparator, said monostable device activating for a prefixed time period a current generator and a circuit setting the operating frequency of the half bridge, said current generator charging the capacitor for the prefixed time period, said means comprising another comparator comparing said voltage across the capacitor and a second reference voltage and acting on said circuit when the voltage across the capacitor is equal to a second reference voltage so as said circuit to increase the operating frequency of the half bridge at the maximum value, said turning off means comprising another comparator comparing said voltage across the capacitor and a third reference voltage and turning off the converter when said voltage across the capacitor reaches said third reference voltage.

7. The protection device according to claim 6, wherein said circuit comprises an oscillator controlled by a signal and increasing the oscillation frequency as a response to the reduction of said signal, and including a switch to reduce said signal.

8. The protection device according to claim 1, further comprising means to reduce the duty-cycle of at least one power transistor for reducing the peak current flowing through it.

9. The protection device according to claim 8, further comprising a comparator to compare a supply voltage and a reference voltage having a value comprised between the turning off voltage and the turning on voltage, said comparator turning on a transistor when the supply voltage has a value higher than the turning off voltage and lower than the reference voltage, said transistor acting on a driving signal of the at least one power switch to reduce the duty-cycle so as to reduce the peak current flowing through the power transistor.

10. The protection device according to claim 8, further comprising a differential pair of transistors having in input a supply voltage and a reference voltage having a value comprised between the turning of voltage and the turning on voltage, said differential pair acting on a driving signal of the at least one power switch to reduce progressively the duty-cycle so as to progressively reduce the peak current flowing through the power transistor as a response of the reduction of the value of supply voltage.

11. The protection device according to claim 1, wherein said converter comprises a LLC resonant converter, said control means forcing the at least one power switch to operate at the maximum operating frequency.

12. The protection device according to claim 11, further comprising a comparator to compare a supply voltage and a reference voltage having a value between the turning off voltage and the turning on voltage, said comparator turning on a transistor when the supply voltage has a value higher than the turning off voltage and lower than the reference voltage, said transistor acting on a circuit to set the operating frequency of the converter so as said circuit to increase the operating frequency of said at least one power switch at the maximum value.

13. A method for protecting a converter, said converter comprising at least one power switch, said method comprising a first step of turning off of the converter after a first time period from the time of the overload or short-circuit in the converter, further comprising another step before the first step for controlling said at least one power switch so as to minimize the power of the converter for a second time period from the end of the first time period until the turning off of the converter, wherein the first time period comprises a predetermined time period set by charging a capacitor at a first rate, and wherein the second time period comprises a predetermined time period set by charging the capacitor at a second rate.

* * * * *